United States Patent
Cook et al.

(10) Patent No.: US 9,013,141 B2
(45) Date of Patent: *Apr. 21, 2015

(54) PARASITIC DEVICES FOR WIRELESS POWER TRANSFER

(75) Inventors: Nigel P. Cook, El Cajon, CA (US); Lukas Sieber, Olten (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 732 days.

This patent is subject to a terminal disclaimer.

(21) Appl. No.: 12/756,755

(22) Filed: Apr. 8, 2010

(65) Prior Publication Data

US 2010/0277120 A1    Nov. 4, 2010

Related U.S. Application Data

(60) Provisional application No. 61/173,569, filed on Apr. 28, 2009.

(51) Int. Cl.
| | |
|---|---|
| *H02J 7/00* | (2006.01) |
| *H02J 5/00* | (2006.01) |
| *H01Q 19/00* | (2006.01) |
| *H02J 7/02* | (2006.01) |
| *H02J 17/00* | (2006.01) |

(52) U.S. Cl.
CPC ............. *H02J 5/005* (2013.01); *H01Q 19/005* (2013.01); *H02J 7/025* (2013.01); *H02J 17/00* (2013.01)

(58) Field of Classification Search
USPC .................... 320/108, 113, 115, 137; 307/104
See application file for complete search history.

(56) References Cited

U.S. PATENT DOCUMENTS

| | | | |
|---|---|---|---|
| 6,011,519 A | 1/2000 | Sadler et al. | |
| 6,040,680 A | 3/2000 | Toya et al. | |
| 6,137,445 A | 10/2000 | Ha et al. | |
| 7,518,267 B2* | 4/2009 | Baarman | 307/150 |
| 7,791,311 B2* | 9/2010 | Sagoo | 320/108 |
| 7,825,543 B2* | 11/2010 | Karalis et al. | 307/104 |
| 7,872,445 B2* | 1/2011 | Hui | 320/108 |
| 2004/0004460 A1 | 1/2004 | Fitch et al. | |
| 2005/0134213 A1* | 6/2005 | Takagi et al. | 320/108 |

(Continued)

FOREIGN PATENT DOCUMENTS

| | | |
|---|---|---|
| CN | 1457530 A | 11/2003 |
| CN | 1695283 A | 11/2005 |
| JP | 2000090220 A | 3/2000 |
| JP | 2001024548 A | 1/2001 |
| JP | 2006021793 A | 1/2006 |
| JP | 2007166763 A | 6/2007 |

(Continued)

OTHER PUBLICATIONS

International Search Report and Written Opinion—PCT/US2010/032854, International Search Authority—European Patent Office—Sep. 1, 2010.

*Primary Examiner* — Edward Tso
*Assistant Examiner* — Aaron Piggush
(74) *Attorney, Agent, or Firm* — Knobbe, Martens, Olson & Bear LLP

(57) ABSTRACT

Exemplary embodiments are directed to wireless power transfer. A method may include wirelessly receiving power from a near field in a first near field coupling mode region with at least one parasitic antenna coupled to a housing having a chargeable device positioned therein. The method may further include generating an enhanced near field from the near field with the at least one parasitic antenna and wirelessly receiving power from the enhanced near field at an at least one receive antenna coupled to the chargeable device.

40 Claims, 10 Drawing Sheets

(56) References Cited

U.S. PATENT DOCUMENTS

| | | |
|---|---|---|
| 2007/0090790 A1* | 4/2007 | Hui .............................. 320/108 |
| 2007/0278998 A1 | 12/2007 | Koyama |
| 2009/0033279 A1* | 2/2009 | Pinedjian ..................... 320/108 |
| 2009/0039828 A1 | 2/2009 | Jakubowski |
| 2009/0179502 A1 | 7/2009 | Cook et al. |
| 2009/0212636 A1 | 8/2009 | Cook et al. |
| 2009/0224609 A1 | 9/2009 | Cook et al. |
| 2010/0045114 A1* | 2/2010 | Sample et al. ............... 307/104 |

FOREIGN PATENT DOCUMENTS

| | | |
|---|---|---|
| JP | 2008508842 A | 3/2008 |
| JP | 2009527147 A | 7/2009 |
| JP | 2011504354 A | 2/2011 |
| WO | WO02071536 | 9/2002 |
| WO | WO-2006011769 A1 | 2/2006 |
| WO | WO-2009047769 A2 | 4/2009 |

\* cited by examiner

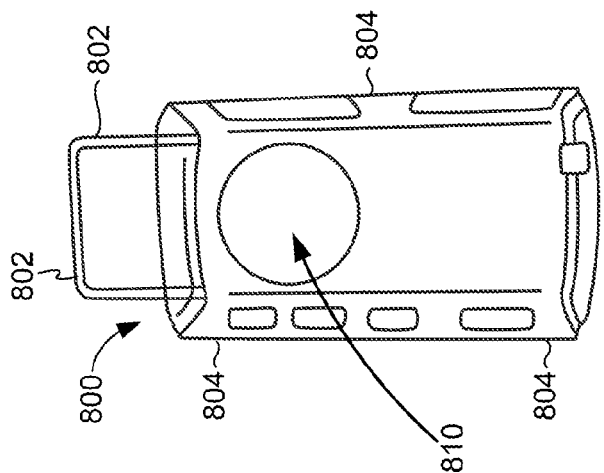
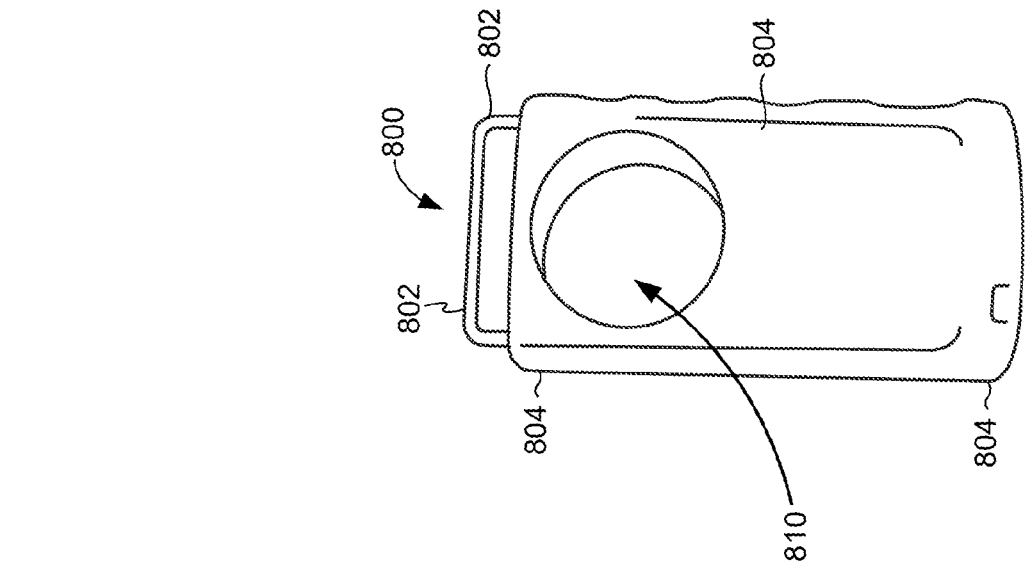
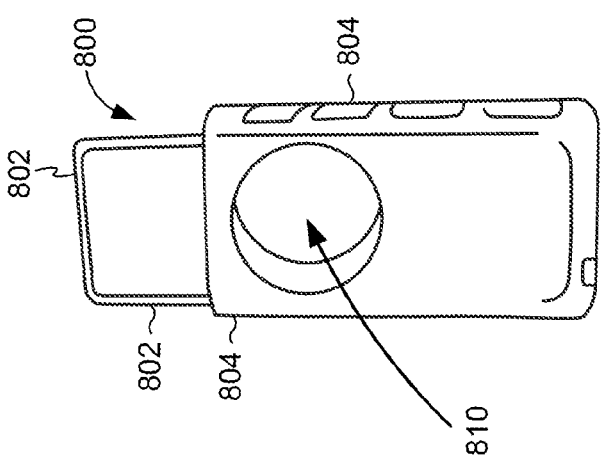
FIG. 11
FIG. 12
FIG. 13

PARASITIC DEVICES FOR WIRELESS POWER TRANSFER

CLAIM OF PRIORITY UNDER 35 U.S.C. §119

This application claims priority under 35 U.S.C. §119(e) to U.S. Provisional Patent Application 61/173,569 entitled "PARASITIC CAGES" filed on Apr. 28, 2009, the disclosure of which is hereby incorporated by reference in its entirety.

BACKGROUND

1. Field

The present invention relates generally to wireless power, and more specifically to parasitic devices for wireless power transfer and methods of operation thereof.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas may be of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach may have the capability to simultaneously charge multiple devices in the same area, this area is typically small, hence the user must locate the devices to a specific area.

A transmit antenna exhibits a finite near-field coupling mode region, which may diminish quickly as a receive antenna moves away from the transmit antenna. Furthermore, some receivers, which are configured for close "proximity" coupling applications (i.e., strongly coupled regime) may not be able efficiently receive wireless power in a "vicinity" coupling (i.e., loosely coupled regime) system.

A need exists for devices and methods to enhance coupling between a transmitter and a receiver. More specifically, a need exists for devices and methods to enhance coupling between a transmitter, which is configured to operate in accordance with a loosely coupled regime, and a receiver, which is configured for a strongly coupled regime.

BRIEF DESCRIPTION OF THE DRAWINGS

FIGS. 11-13 are further illustrations of the device of FIGS. 9 and 10.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
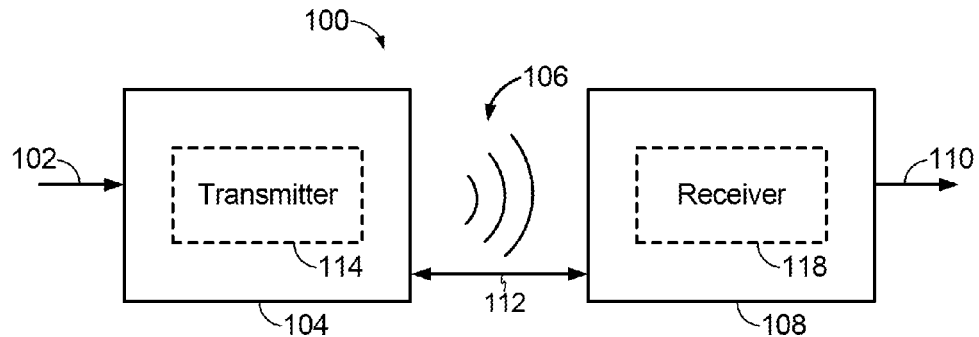
FIG. 1 shows a simplified block diagram of a wireless power transmission system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a near field coupling mode region.

Figure 2:
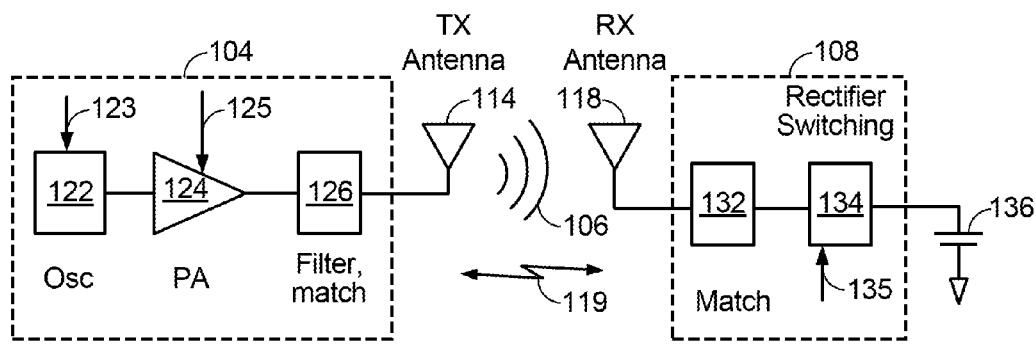
FIG. 2 shows a simplified schematic diagram of a wireless power transmission system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
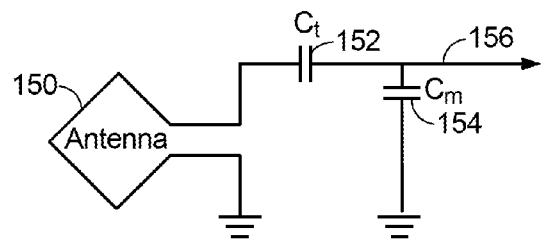
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a near field coupling mode region (i.e., in the near-field) of the driven Tx loop antenna.

Figure 4:
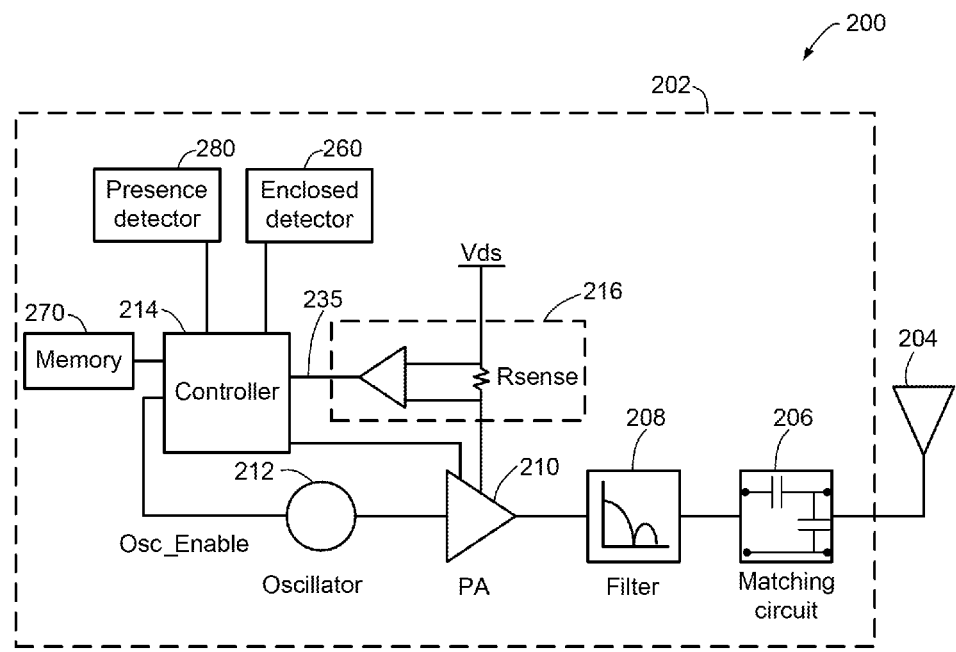
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

Figure 5:
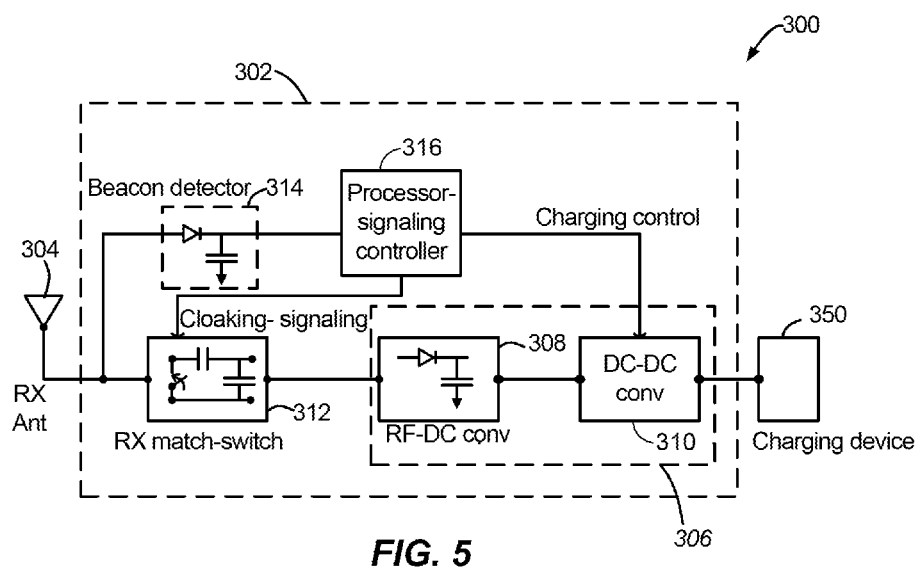
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

In an exemplary embodiment, communication between the transmitter and the receiver refers to a device sensing and charging control mechanism, rather than conventional two-way communication. In other words, the transmitter uses, for example, on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as signal forming a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Various exemplary embodiments disclosed herein identify different coupling variants which are based on different power conversion approaches, and the transmission range including device positioning flexibility (e.g., close "proximity" coupling for charging pad solutions at virtually zero distance or "vicinity" coupling for short range wireless power solutions). Close proximity coupling applications (i.e., strongly coupled regime, coupling factor typically k>0.1) provide energy transfer over short or very short distances typically in the order of millimeters or centimeters depending on the size of the antennas. Vicinity coupling applications (i.e., loosely coupled regime, coupling factor typically k<0.1) provide energy transfer at relatively low efficiency over distances typically in the range from 10 cm to 2 m depending on the size of the antennas. While "vicinity" coupling between a transmitter and receiver may not provide high efficiency energy transfer, "vicinity" coupling provides flexibility in positioning of the receiver (with the device attached thereto) with respect to the transmitter antenna.

Figure 6:
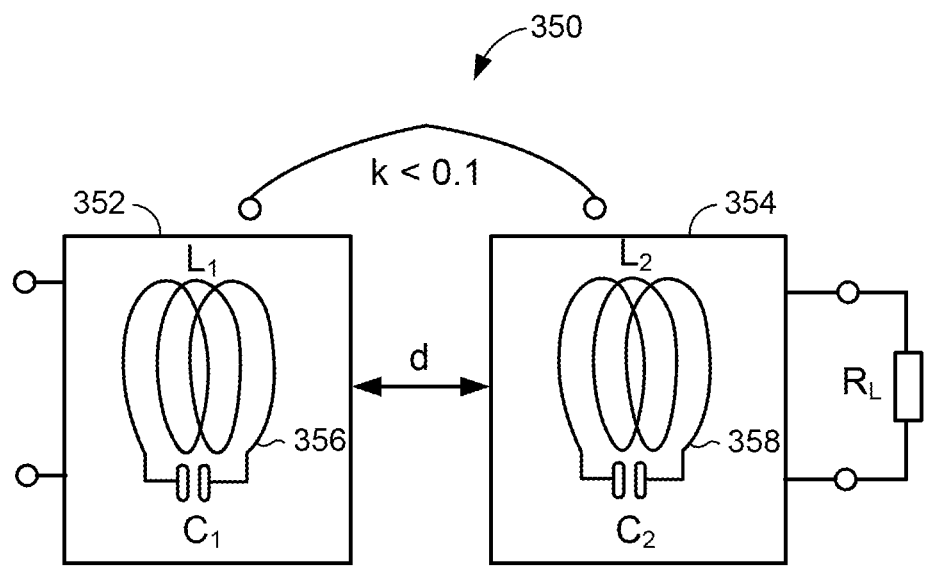
FIG. 6 illustrates proximity coupling of a transmitter and a receiver in a wireless power transmission system, in accordance with an exemplary embodiment of the present invention.

As described herein, "proximity" coupling and "vicinity" coupling may require different matching approaches to adapt power source/sink to the antenna/coupling network. Moreover, the various exemplary embodiments provide system parameters, design targets, implementation variants, and specifications for both LF and HF applications and for the transmitter and receiver. Some of these parameters and specifications may vary, as required for example, to better match with a specific power conversion approach FIG. 6 illustrates a functional block diagram of a first coupling variant between transmit and receive antennas, in accordance with an exemplary embodiment. The coupling variant 350 of FIG. 6 illustrates a "vicinity" coupling variant and may be used to couple to a high-Q resonant tank circuit used for "vicinity" coupling. Coupling variant 350 transforms impedances to match with power conversion circuitry resulting in an improved or high transfer efficiency. Specifically, coupling variant 350 includes a transmit antenna 352 configured to resonate and a resonant frequency and a receive antenna 354 configured to resonate at the same resonant frequency.

Transmit antenna 352 includes a high-Q tank resonator 356, including capacitor $C_1$ and inductor $L_1$. Receive antenna 354 includes a high-Q tank resonator 358, including capacitor $C_2$ and inductor $L_2$. Vicinity coupling applications (i.e., loosely coupled regime with a coupling factor typically k<0.1) provide energy transfer at relatively low efficiency over distances d typically in the range from 10 cm to 2 m depending on the size of the antennas.

Figure 7:
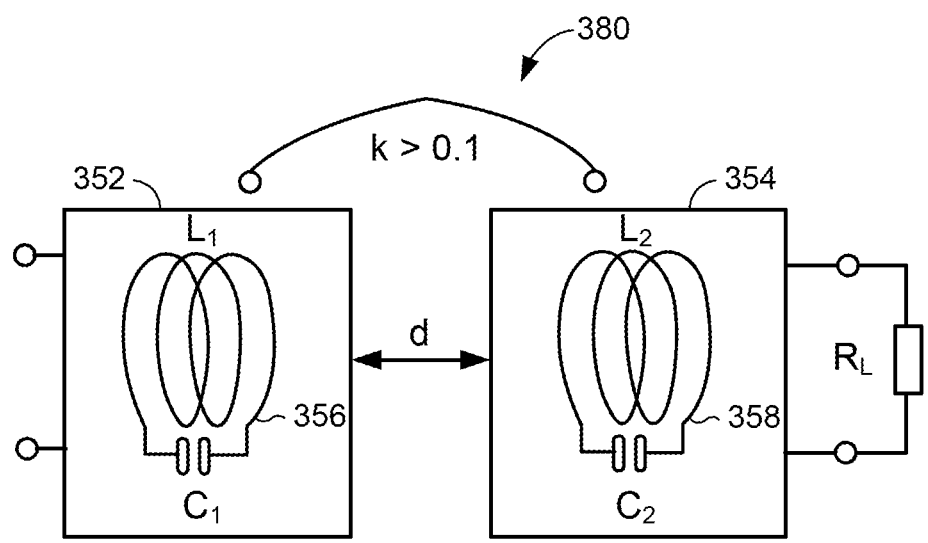
FIG. 7 illustrates vicinity coupling of a transmitter and a receiver in a wireless power transmission system, in accordance with an exemplary embodiment.

FIG. 7 illustrates a functional block diagram of a second coupling variant between transmit and receive antennas, in accordance with an exemplary embodiment. The coupling variant 380 of FIG. 7 illustrates a "proximity" coupling variant, in accordance with an exemplary embodiment. Coupling variant 380 includes coupled series tank circuits includes the transmit antenna 352 and the receive antenna 354 of FIG. 6, including the transmit antenna 352 including the high-Q tank resonator 356, including capacitor $C_1$ and inductor $L_1$, and the receive antenna 354 including the high-Q tank resonator 358, including capacitor $C_2$ and inductor $L_2$. Close proximity coupling applications (i.e., strongly coupled regime with a coupling factor typically k>0.1) provide energy transfer over short or very short distances d typically in the order of millimeters or centimeters, depending on the size of the antennas.

Generally, wireless power transfer according to resonant induction is improved by determining an optimum load resistance resulting in maximized transfer efficiency for given antenna parameters (e.g., unloaded Q-factors, L-C ratios, and transmitter source impedance). The optimum loading depends on coupling factor k. Conversely, there exists an optimum receive L-C ratio or load transformation maximizing efficiency for a given load resistance.

Exemplary embodiments of the invention include methods, systems, and devices for enhancing the coupling between a transmit antenna and a receive antenna in a near-field power transfer system. More specifically, coupling between a transmit antenna and a receive antenna may be enhanced through introduction of one or more additional antennas, which may enhance the flow of power from the transmitting antenna toward the receiving antenna. These additional antennas may comprise repeater antennas, such as parasitic antennas, also known as an "energy relay" coil/antenna/loop, "repeater" coil/antenna/loop, or passive coil/antenna/loop. A parasitic antenna may include simply an antenna loop and a capacitive element for tuning a resonant frequency of the antenna.

The combination of a transmit antenna and a parasitic antenna in a power transfer system may be optimized such that coupling of power to receive antennas is enhanced based on factors such as termination loads, tuning components, resonant frequencies, and placement of the parasitic antennas relative to the transmit antenna. A parasitic antenna may refocus and/or reshape a near field coupling mode region from a transmit antenna to create a second near field coupling mode region around the parasitic antenna, which may be better suited for coupling energy to a receive antenna.

Figure 8:
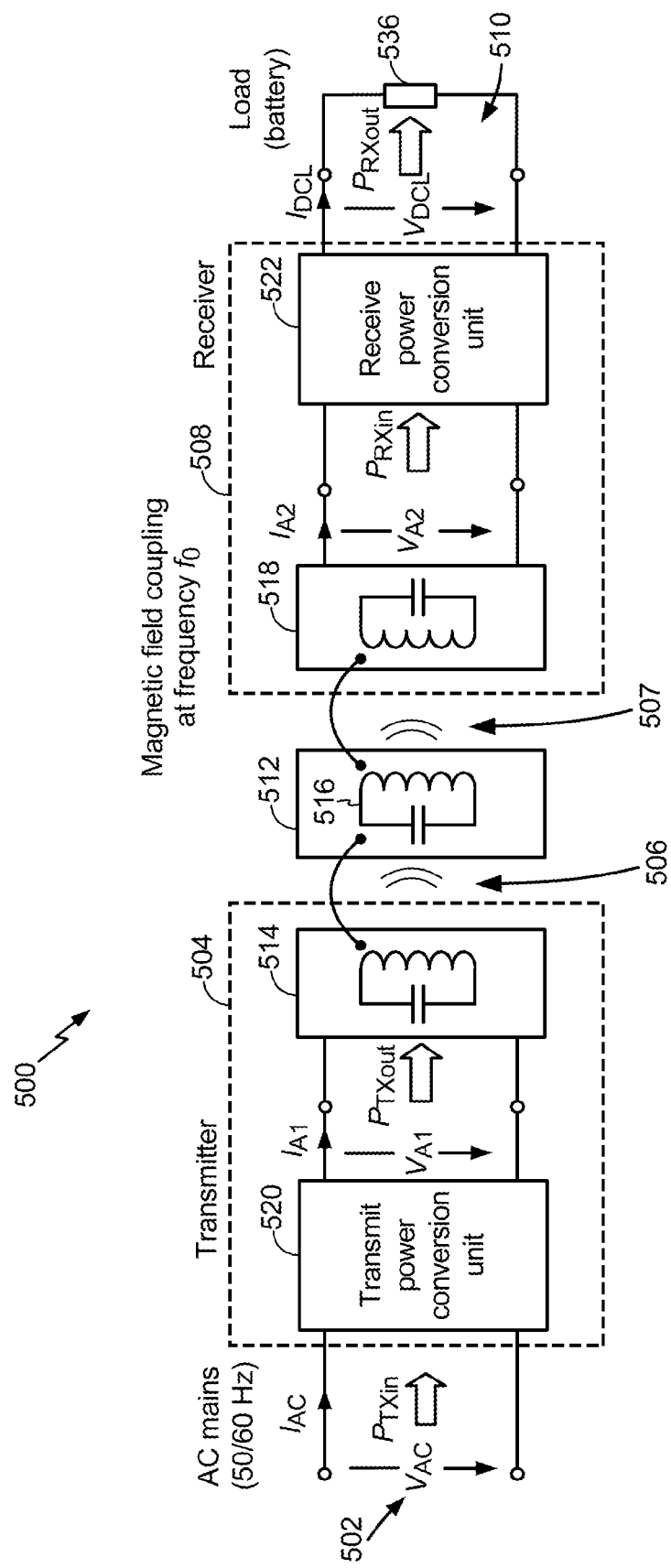
FIG. 8 illustrates a functional block diagram of a wireless power transmission system including a passive energy relay, in accordance with an exemplary embodiment of the present invention.

FIG. 8 illustrates a functional block diagram of a wireless power transmission system configured for indirect field coupling between a transmitter, a parasitic energy relay and a receiver, in accordance with an exemplary embodiment. Wireless power transmission system 500 includes a transmitter 504, a passive energy relay (parasitic resonant tank or passive resonant tank) 512 and a receiver 508. Input power $P_{TXin}$ is provided to transmitter 504 for generating a predominantly non-radiative field with field coupling k 506 for providing energy transfer to passive energy relay 512 which generates a predominantly non-radiative field with field coupling 507 to receiver 508. Receiver 508 couples to the non-radiative field generated by passive energy relay 512 and generates an output power $P_{RXout}$ for storing or consumption by a battery or load 536 coupled to the output port 510.

Each of the transmitter 504, passive energy relay 512 and the receiver 508 are separated by a distance. In one exemplary embodiment, transmitter 504 and passive energy relay 512 are configured according to a mutual resonant relationship and when the resonant frequency, $f_o$, of passive energy relay 512 and the resonant frequency of transmitter 504 are matched, transmission losses between the transmitter 504 and the passive energy relay 512 are minimal while the passive energy relay 512 is located in the "near-field" of the radiated field generated by transmitter 504. Furthermore, passive energy relay 512 and receiver 508 are configured according to a mutual resonant relationship and when the resonant frequency, $f_o$, of receiver 508 and the resonant frequency of passive energy relay 512 are matched, transmission losses between the passive energy relay 512 and the receiver 508 are minimal while the receiver 508 is located in the "near-field" of the radiated field generated by passive energy relay 512.

Transmitter 504 further includes a transmit antenna 514 for providing a means for energy transmission, passive energy relay 512 further includes a parasitic antenna 516 for providing a means for passively relaying energy, and receiver 508 further includes a receive antenna 518 for providing a means for energy reception. Transmitter 304 further includes a transmit power conversion unit 520 at least partially function as an AC-to-AC converter. Receiver 308 further includes a receive power conversion unit 522 at least partially functioning as an AC-to-DC converter. In operation, transmitter 504 functions as an "exciter" of energy relay 512 generation of a magnetic near-field around parasitic antenna 516. The magnetic near-field of energy relay 512 then couples to receive antenna 518 of receiver 508. Accordingly, intermediate energy relay 512 facilitates the transfer of the energy exhibited at the transmit antenna 514 to effectively be received at the receiver antenna 518.

As will be appreciated by a person having ordinary skill in the art, a receiver integrated within a particular electronic device (e.g., a cellular telephone or a portable media player) may be designed (i.e., matched) for close proximity coupling. For example only, a receiver integrated within cellular telephone may be designed for receiving wireless power from a charging pad over a very short distance in a strongly coupled regime. On the other hand, some wireless power systems and, more specifically, wireless chargers within wireless power systems, may be better suited for "vicinity" coupling applications (i.e., loosely coupled regime). For example only, a wireless power system including a wireless charger mounted on a ceiling or a wall may be suited for transmitting wireless power to receivers positioned on a table and in the vicinity of the wireless charger (e.g., within 10 cm to 2 m). Accordingly, attempting to charge a receiver, which is designed for close proximity coupling, within a loosely coupled regime may result in inadequate charging efficiency.

Figure 10:
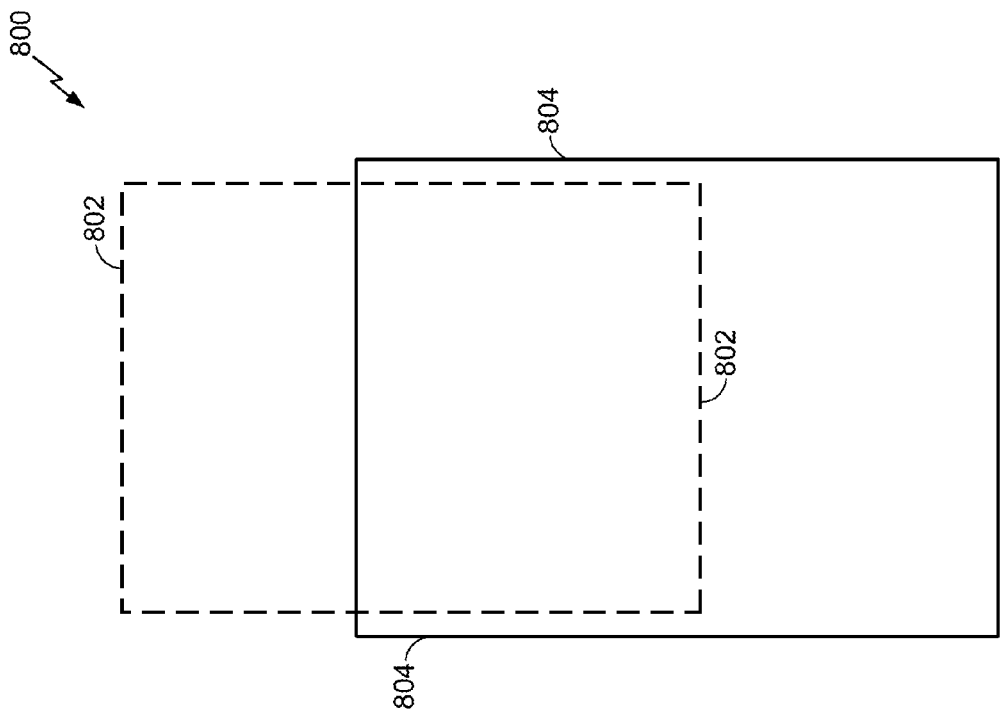
FIG. 10 is another illustration of the device of FIG. 9.
Figure 9:
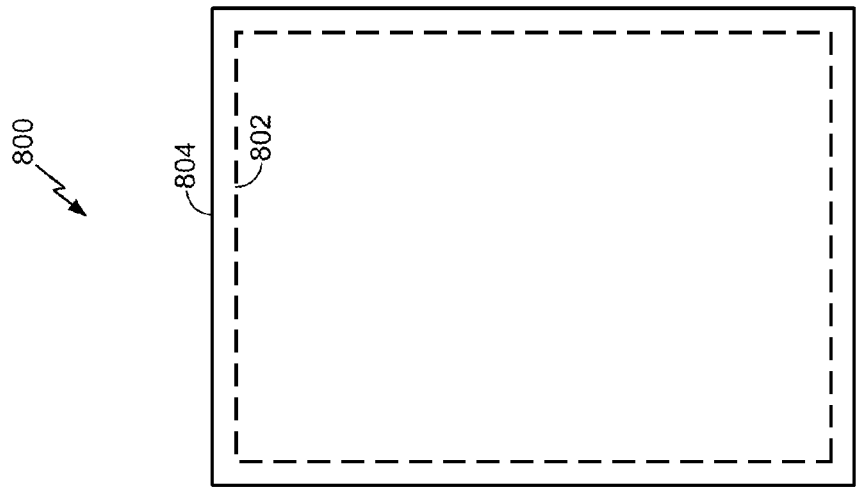
FIG. 9 is an illustration of a device including a parasitic antenna, according to an exemplary embodiment of the present invention.

Various exemplary embodiments as described herein are directed to a device having at least one parasitic antenna coupled thereto and configured to accommodate a chargeable device, which may include one or more receive antennas. FIGS. 9 and 10 depict a device 800 including a housing 804 (e.g., a sleeve, a case, or a cage) and at least one antenna 802, which may be configured as a parasitic antenna, such as parasitic antenna 516 described above. More specifically, antenna 802 may comprise a parasitic antenna configured to receive and retransmit energy by means of a near field. For example only, antenna 802 may comprise a capacitively loaded loop antenna, a capacitively loaded multi-turn coil, or a combination thereof. As will be appreciated by one of ordinary skill in the art, antenna 802 may include an LC constant for tuning a resonant frequency (e.g. 13.56 MHz.) of the antenna. For example, antenna 802 may be configured to refocus a near field coupling mode region and/or reshape a near field coupling mode region from a transmit antenna to create a second near field coupling mode region around antenna 802, which may be better suited for coupling energy to a receive antenna.

According to one exemplary embodiment as illustrated in FIG. 10, antenna 802 may be configured to enable at least a portion thereof to be positioned within an outer surface of housing 804 (i.e., at least a portion of antenna 802 is at least partially surrounded by housing 804) and at least a portion to extend beyond an outer surface of housing 804. It is noted that antenna 802 may be movable with respect to housing 804 and, therefore, the size of the portion of antenna 802 that extends beyond an outer surface of housing 804 may be adjustable. As depicted in FIG. 9, antenna 802 is shown as being fully retracted within an outer surface of housing 804. In contrast, as illustrated in FIG. 10, at least a portion of antenna 802 is extending out from housing 804. According to another exemplary embodiment, antenna 802 may be coupled to a surface of housing 804.

With reference to FIGS. 9-13, housing 804 may comprise any non-conductive material. By way of example only, housing 804 may comprise plastic, rubber, or a combination thereof. Furthermore, according to one exemplary embodiment, housing 804 may be configured and sized to accommodate an electronic device, such as, for example only, a cellular telephone, a portable media player, a camera, or any combination thereof. Stated another way, housing 804 may be configured to securely fit at least partially around an electronic device. More specifically, for example only, housing 804 may be configured and sized to receive an electronic device in a manner to enable antenna 802 to be positioned proximate a receive antenna, which is coupled to and associated with the electronic device. It is noted that, according to one or more exemplary embodiments, housing 804 may be configured to fit tightly around an electronic device. According to another exemplary embodiment, a surface of housing 804 may be removably attachable to a surface of an electronic device.

Furthermore, housing 804 may include one or more access openings 810 configured to enable a device user to access one or more input or output devices. For example housing 804 may include one or more access openings 810 to enable a device user to access a display panel, a connector, or any other peripherals (e.g., buttons) of an electronic device positioned within housing 804. It is noted that housing 804 may comprise any known and suitable device configured to receive at least a portion of an electronic device. By way of example only, housing 804 may comprise a sleeve, a shell, a cage, a case, a cover, or any combination thereof. Antenna 802, as depicted in FIG. 13, is shown as being in a more retracted state than antenna 802 illustrated in FIG. 11 or FIG. 12. It is noted that compared to being fully retracted, an antenna (i.e., antenna 802) which is at least partially extending from housing 804 may be more easily pulled out by a device user.

Figure 14:
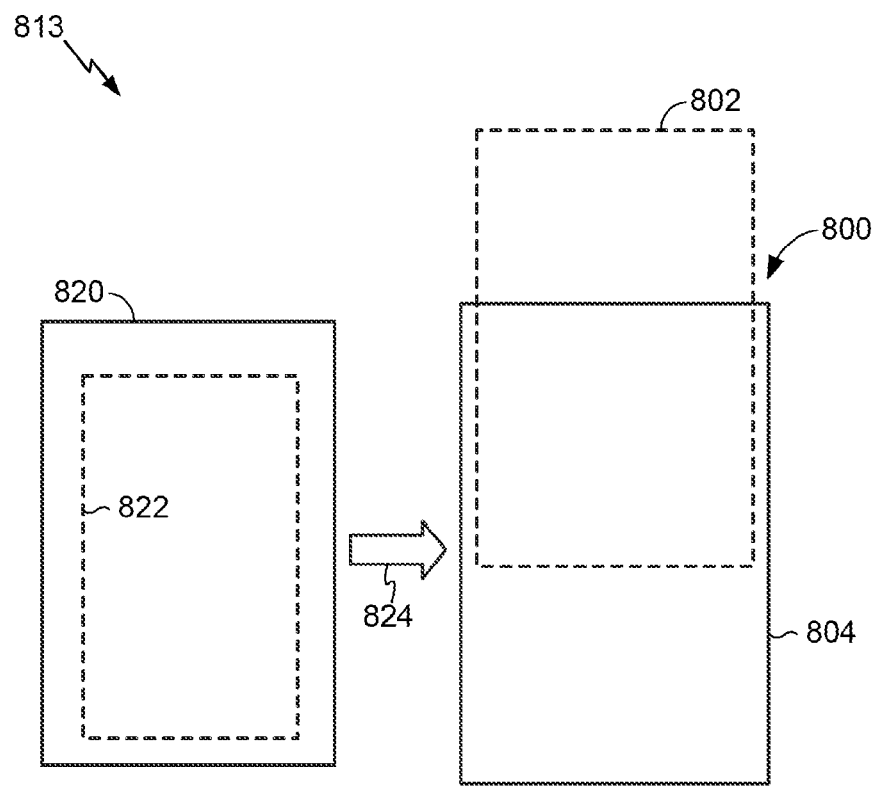
FIG. 14 is an illustration of a system including a device having a parasitic antenna and an electronic device, according to an exemplary embodiment of the present invention.
Figure 15:
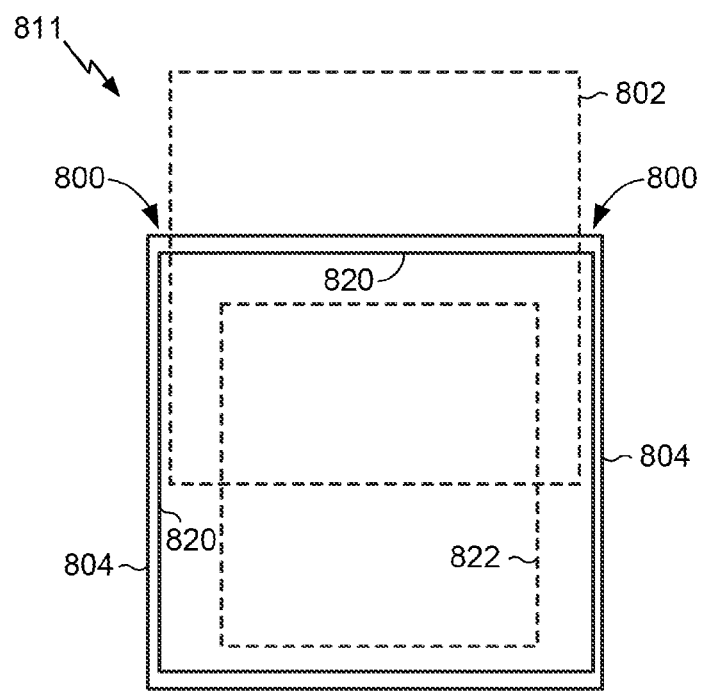
FIG. 15 is an illustration of a system including an electronic device positioned within a device having a parasitic antenna, according to an exemplary embodiment of the present invention.

FIG. 14 illustrates a system 813 including an electronic device 820, which may comprise any known and suitable chargeable device. Electronic device 820 may include at least one receive antenna 822 configured to receive power wirelessly transmitted from another antenna (e.g., antenna 802). More specifically, antenna 822 and an associated receiver, such as receiver 508 of FIG. 8, may be configured to receive wireless power transmitted from another antenna positioned within an associated near-field region. Additionally, electronic device 820 may be configured to store received power within a battery (e.g., battery 536 of FIG. 8) of electronic device 820. As depicted by arrow 824, electronic device 820 may be configured to be positioned within housing 804 of device 800. FIG. 15 depicts a system 811 including electronic device 820 positioned within housing 804, wherein at least a portion of antenna 822 is positioned proximate at least a portion of antenna 802.

With reference to FIG. 15, in the absence of antenna 802, loading of receive antenna 822 (e.g. by receive power conversion) may be non-optimum to receive energy in a loosely coupled regime resulting in very poor energy transfer efficiency. However, it may be optimum or nearly optimum in a strongly coupled regime. With the addition of antenna 802 to system 811, an impedance transformation may be effected such that load resistance as presented by power conversion may be optimum or nearly optimum maximizing transfer efficiency if operated in a loosely coupled regime. Stated another way, the addition of antenna 802 may change the effect and the functioning of antenna 822 to a coupling and impedance transformation network that optimally or nearly optimally loads antenna 802 if antenna 822 is loaded by an associated receive power conversion unit (e.g., receive power conversion unit 522). In the embodiment illustrated in FIG. 15, antenna 802 may be considered as a primary energy receiving antenna and antenna 822 may be considered as a coupling and impedance transformation network.

Figure 16:
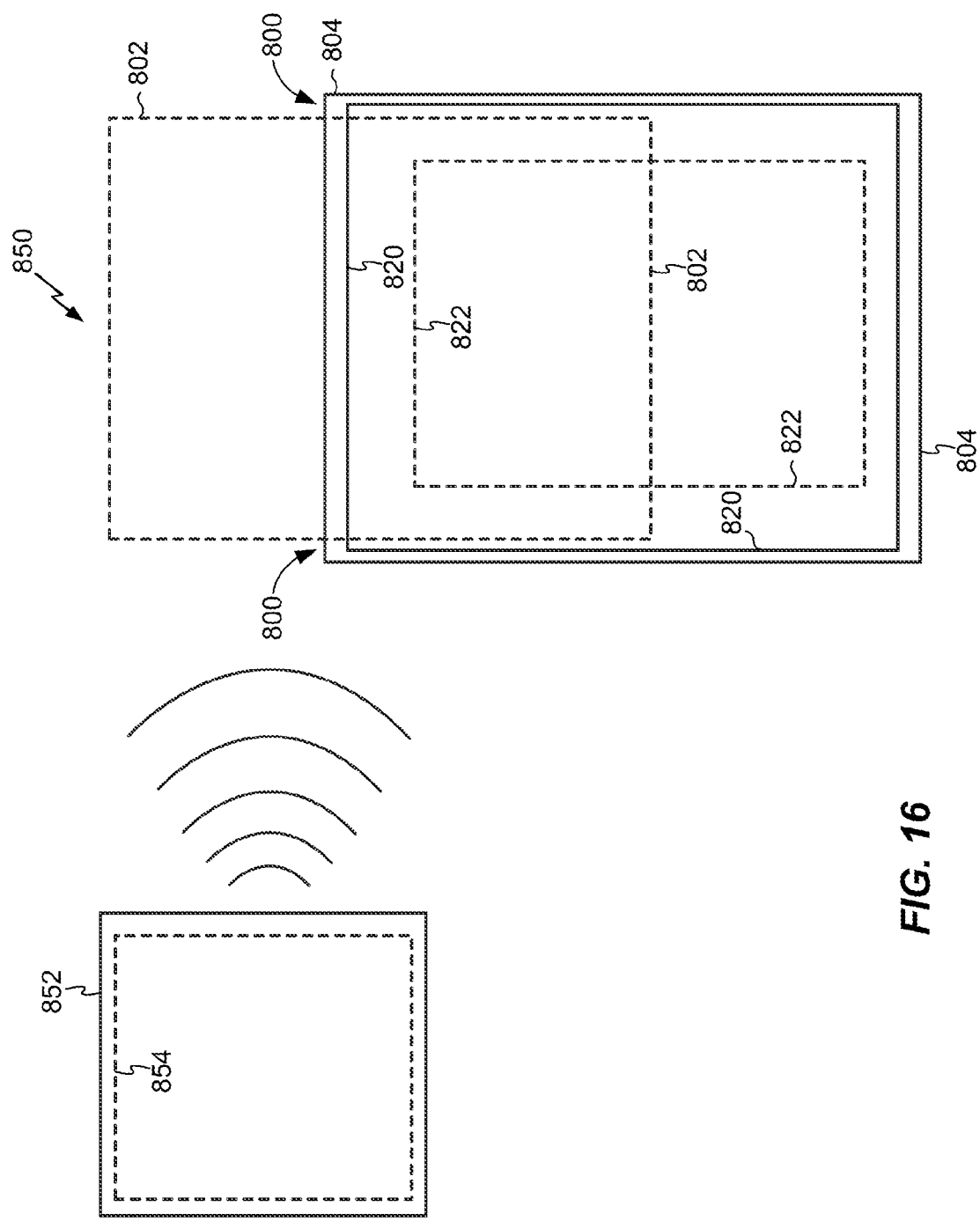
FIG. 16 is an illustration of a system including an electronic device positioned within a device having a parasitic antenna and a wireless charger, in accordance with an exemplary embodiment of the present invention.
Figure 17:
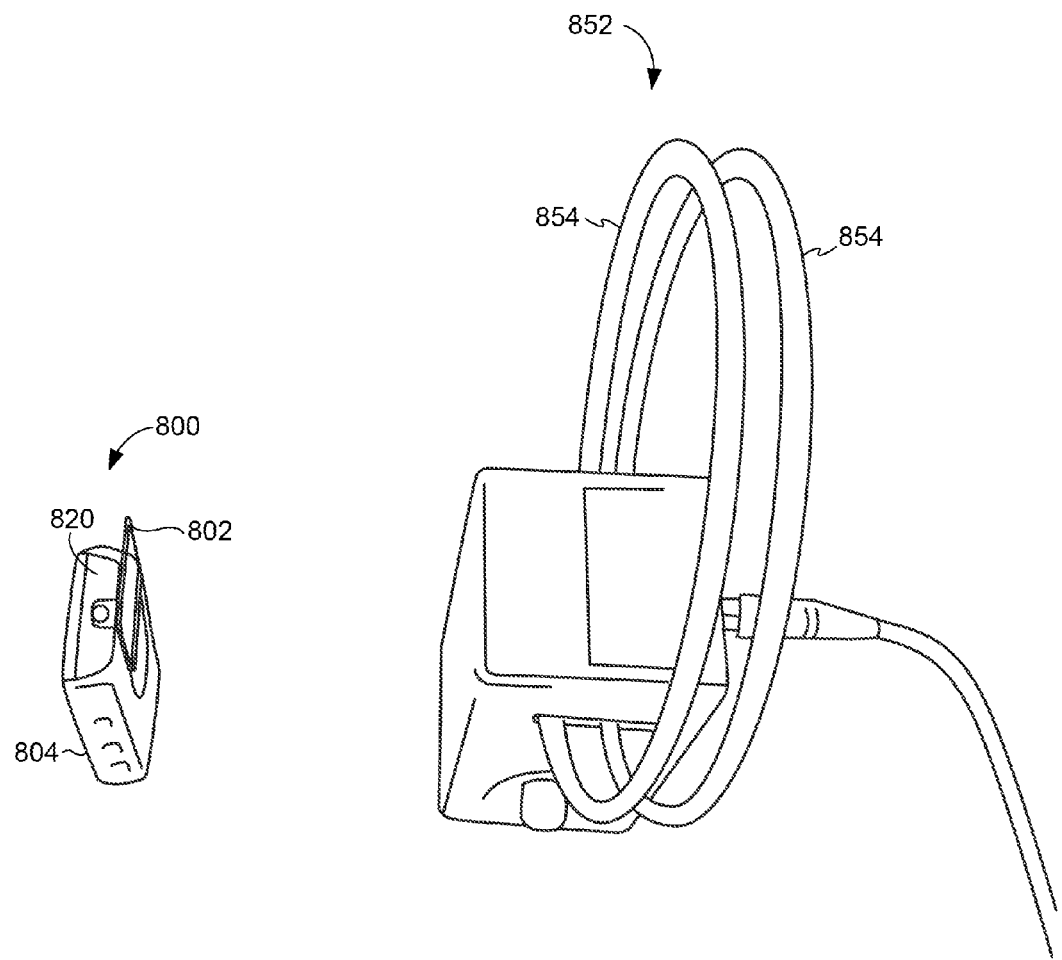
FIG. 17 is another illustration of the system of FIG. 16.

FIG. 16 illustrates a system 850 including a wireless charger 852 and device 800, which includes electronic device 820 positioned within associated housing 804. Wireless charger 852 may include at least one transmit antenna 854 configured to wirelessly transmit power within an associated near-field region. More specifically, transmit antenna 854 and an associated transmitter, such as transmitter 304 of FIG. 8, may be configured to transmit wireless power to a receiver within an associated near-field region. FIG. 17 in another depiction of system 850 including wireless charger 852, and electronic device 820 positioned within housing 804 of device 800. It is noted that, according to one exemplary embodiment, electronic device 820, which may be generally matched for "proximity" coupling, may wirelessly receive power from wireless charger 852, which may be generally matched for vicinity coupling, by utilizing antenna 802 for impedance transformation.

In comparison to antenna 822, antenna 802 may be positioned farther away from electronics within electronic device 820 and, therefore, during operation, antenna 802 may be less dampened and an associated magnetic field may be less impeded by the electronics in comparison to antenna 822 resulting in a gain of performance. Furthermore, as noted above, antenna 802 may be configured to be displaced relative to housing 804 and, therefore, may extend out from housing 804 and away from electronic device 820. As a result, damping of antenna 802 caused by electronics within electronic device 820 may be further reduced thus further increasing performance.

Figure 18:
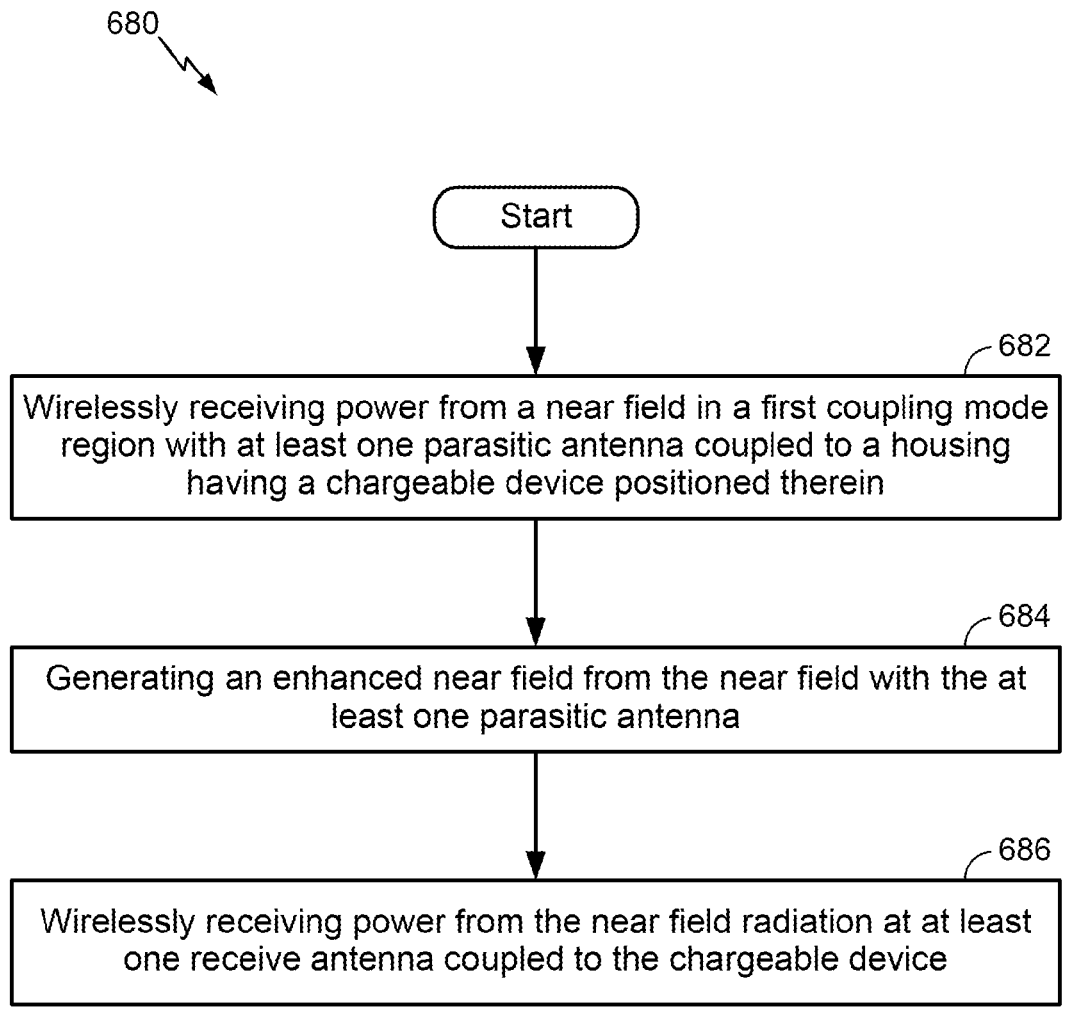
FIG. 18 is a flowchart illustrating a method, in accordance with an exemplary embodiment of the present invention.

In one contemplated operation of system 850, transmit antenna 854 may wirelessly transmit power, which may be received by antenna 802, which is tuned to resonate at the same frequency, or near the same frequency, as transmit antenna 854. Upon receipt of power, antenna 802 may transmit power within a near-field of antenna 802. The power transmitted by antenna 802 may be received by a receive antenna, which is positioned within an associated near field coupling mode region and tuned to resonate at the same frequency, or near the same frequency, as antenna 802. For example, power wirelessly transmitted from antenna 802 may be received by antenna 822 coupled to a battery (e.g., battery 336 of FIG. 8) within electronic device 820. More specifically, power wirelessly transmitted from antenna 802 may be received by antenna 822 and an associated receiver, such as receiver 308 (see FIG. 8), which may be coupled to a battery within electronic device 820. As described above, utilizing a parasitic antenna may increase the charging rate of a device by refocusing a near field coupling mode region, reshaping a near field coupling mode region, or any combination thereof FIG. 18 is a flowchart illustrating a method 680, in accordance with one or more exemplary embodiments. Method 680 may include wirelessly receiving power from a near field in a first near field coupling mode region with at least one parasitic antenna coupled to a housing having a chargeable device positioned therein (depicted by numeral 682). Method 680 may further include generating an enhanced near field from the near field with the at least one parasitic antenna (depicted by numeral 684). Furthermore, method 680 may include wirelessly receiving power from the enhanced near field at at least one receive antenna coupled to the chargeable device (depicted by numeral 686).

Various exemplary embodiments of the present invention, as described herein, may enable for enhanced wireless charging efficiency of a receiver associated with an electronic device. More specifically, wireless charging efficiency of the receiver, which may be designed for close "proximity" coupling, may be enhanced through use of a parasitic antenna positioned proximate thereto and configured to receive wireless power from a wireless charger and re-radiate the received power. Moreover, exemplary embodiments of the present invention enable for reduced damping of a parasitic antenna caused by device electronics.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device configured to wirelessly relay power, the device comprising:
    a housing comprising a sleeve or case configured to receive a chargeable electronic device; and
    a repeater antenna coupled to the housing, at least a portion of the repeater antenna positioned within the housing, the repeater antenna configured to receive charging power from a first coupling mode region generated by a transmit antenna and configured to generate a second coupling mode region for coupling the received charging power to a receive antenna of the chargeable electronic device to power or charge the chargeable electronic device.

2. The device of claim 1, wherein the repeater antenna is displaceable relative to the housing.

3. The device of claim 1, wherein the housing comprises a non-conductive material.

4. The device of claim 3, wherein the non-conductive material comprises at least one of plastic or rubber.

5. The device of claim 1, wherein the housing comprises at least one of a cover, a shell, or a cage.

6. The device of claim 1, wherein the repeater antenna comprises at least one of a capacitively loaded coil or a capacitively loaded multi-turn coil.

7. The device of claim 1, wherein the chargeable electronic device comprises at least one of a cellular telephone, a portable media player, or a camera.

8. The device of claim 1, wherein the housing is configured to fit at least partially around the chargeable electronic device.

9. The device of claim 1, wherein the housing comprises at least one access opening configured to enable a device user to access at least one of an input device or an output device.

10. The device of claim 1, wherein the repeater antenna is configured to at least one of refocus an associated near field coupling mode region to generate a second near field coupling mode region around the repeater antenna or reshape the associated near field coupling mode region to generate the second near field coupling mode region around the repeater antenna.

11. The device of claim 1, wherein the transmit antenna is configured for a loosely coupled regime.

12. The device of claim 1, wherein the repeater antenna is configured to be positioned less than 10 centimeters from the receive antenna.

13. The device of claim 1, wherein the repeater antenna includes a portion thereof extending beyond an outer edge of the housing.

14. The device of claim 1, wherein the receive antenna is configured for a strongly coupled regime.

15. The device of claim 1, wherein the repeater antenna is configured to enhance a near field coupling region.

16. The device of claim 1, wherein the repeater antenna is configured to increase an amount of power received by the receive antenna from the transmit antenna.

17. A method for wirelessly relaying power, comprising:
    wirelessly receiving charging power from a first coupling mode region generated by a transmit antenna at a repeater antenna coupled to a housing comprising a sleeve or a case configured to receive a chargeable electronic device, at least a portion of the repeater antenna positioned within the housing;
    generating a second coupling mode region via the repeater antenna; and
    wirelessly coupling the charging power to a receive antenna of the chargeable electronic device via the second coupling mode region to charge or power the chargeable electronic device.

18. The method of claim 17, wherein the repeater antenna is displaceable relative to the housing.

19. The method of claim 17, wherein wirelessly receiving power comprises wirelessly receiving power at the repeater antenna coupled to the housing comprising a non-conductive material.

20. The method of claim 17, wherein wirelessly receiving power comprises wirelessly receiving power at the repeater antenna coupled to the housing comprising at least one of a rubber material or a plastic material.

21. The method of claim 17, wherein wirelessly receiving power comprises wirelessly receiving power at the repeater antenna coupled to the housing comprising at least one of a cover, a shell, a sheath, or a cage.

22. The method of claim 17, wherein wirelessly receiving power comprises wirelessly receiving power at the repeater antenna comprising at least one of a capacitively loaded coil or a capacitively loaded multi-turn coil.

23. The method of claim 17, wherein the chargeable electronic device comprises at least one of a cellular telephone, a portable media player, or a camera.

24. The method of claim 17, wherein the repeater antenna is configured to at least one of refocus a near field coupling mode region from the transmit antenna to generate a second near field coupling mode region around the repeater antenna or reshape the near field coupling mode region from the transmit antenna to generate the second near field coupling mode region around the repeater antenna.

25. The method of claim 17, wherein wirelessly receiving power comprises wirelessly receiving power from the transmit antenna configured for a loosely coupled regime.

26. The method of claim 17, wherein wirelessly relaying the wirelessly received power comprises wirelessly relaying the wirelessly received power to the receive antenna configured for a strongly coupled regime.

27. The method of claim 17, further comprising enhancing a near field coupling region using the repeater antenna.

28. The method of claim 17, further comprising increasing an amount of power received by the receive antenna from the transmit antenna using the repeater antenna.

29. A device that facilitates charging a chargeable electronic device, the device comprising:
    means for selectively encasing a chargeable electronic device; and
    means for wirelessly receiving charging power from a first coupling mode region generated by a transmit antenna, the receiving means configured to generate a second coupling mode region for coupling the received charging power to a receive antenna of the chargeable electronic device to power or charge the chargeable electronic device, the receiving means being coupled to the encasing means, at least a portion of the receiving means positioned within the encasing means.

30. The device of claim 29, wherein the receiving means comprises a repeater antenna.

31. The device of claim 29, wherein the encasing means comprises a housing comprising a sleeve or a case.

32. The device of claim 29, wherein the receiving means is displaceable relative to the encasing means.

33. The device of claim 29, wherein the encasing means comprises a non-conductive material.

34. The device of claim 29, wherein the receiving means comprises at least one of a capacitively loaded coil or a capacitively loaded multi-turn coil.

35. The device of claim 29, wherein the encasing means comprises means for providing access to a user to at least one of an input device or an output device.

36. The device of claim 29, wherein the transmit antenna is configured for a loosely coupled regime.

37. The device of claim 29, wherein the receive antenna is configured for a strongly coupled regime.

38. The device of claim 29, wherein the receivng means includes a portion thereof extending beyond an outer edge of the encasing means.

39. The device of claim 29, wherein the receiving means is configured to enhance a near field coupling region of the transmit antenna.

40. The device of claim 29, wherein the receiving means is configured to increase an amount of power received by the receive antenna from the transmit antenna.

* * * * *